Dec. 8, 1970  F. C. LEGLER ET AL  3,546,668
TALKING SPEEDOMETER

Filed Sept. 11, 1967  3 Sheets-Sheet 1

INVENTORS
Frank C. Legler
James L. Legler

BY Stephens, Huettig and O'Connell
ATTORNEYS

Fig. 4

INVENTORS
Frank C. Legler
James L. Legler
BY Stephens, Huettig, and O'Connell
ATTORNEYS United States Patent Office 3,546,668
Patented Dec. 8, 1970

3,546,668
TALKING SPEEDOMETER
Frank C. Legler, 639 Azalea Drive, Rockville, Md. 20853, and James L. Legler, 1402 E. Douglas Ave., Nashville, Tenn. 37206
Filed Sept. 11, 1967, Ser. No. 666,787
Int. Cl. B60q 5/00
U.S. Cl. 340—62
6 Claims

ABSTRACT OF THE DISCLOSURE

A multicontact switch connected to a speedometer cable makes a separate contact for each given speed of a vehicle. A tape recording has spoken words of the speeds corresponding to the switch contacts. The switch and tape are electrically interconnected so that, when a tape recorded word coincides with its corresponding switch contact, that word is announced by a loud speaker.

---

This invention relates to means for producing a repeating human voice announcement of the speed of an automobile or any other vehicle.

The operator of an automobile or other vehicle frequently encounters traffic and driving conditions that do not allow him to observe with his eyes the speed of travel as shown on a conventional visual speedometer. Such conditions exist, for example, in highly congested residential and industrial areas where constant and unswerving attention to road traffic activity and conditions is mandatory and at the same time when speed limit laws are strictly enforced, for example, by radar speed measuring equipment. Other such conditions exist when an operator is blinded by light from the sun and when an operator drives a vehicle at night or through a road tunnel.

It is an object of this invention to produce a system for providing human voice announcements to the operator of the vehicle of the speed of a vehicle at regular intervals of times.

An important feature of the system is the synchronizing arrangement by which the reproduction of the recorded announcement is synchronized or correlated with the speed of the vehicle.

An advantage of this invention over manually operated speed limit monitor alarms of established art, for example, as disclosed by Freedman, Pat. No. 2,964,741; Webster, No. 2,715,723; Fairhurst, No. 2,433,895; Johnson, No. 2,311,395; and Addorisio, No. 2,452,344; the types that produce a buzzer sound, an audible tone, or a flashing light whenever a preset speed is exceeded by the vehicle, is the complete elimination of the requirement to adjust manually the speed alarm setting on the monitor alarm during times when posted speed limits are changing rapidly during the course of the vehicle's path of travel or where traffic conditions do not allow a vehicle operator to divert his attention from the road scene.

Furthermore, an advantage of this invention over odometer-type announcing systems of prior art, such as, the type disclosed by Haller, Pat. No. 2,501,048, which produces pre-recorded announcements in conjunction only with objects along the path of travel of a vehicle or announcements dealing only with things or conditions outside the vehicle along such routes, and then only in time synchronism with pre-selected points along the route, is the provision of means in our invention for automatically producing at definite and repeating intervals of time the announcement of vehicle speed without any relation to the location of the vehicle along a route. In addition, this invention is a simple arrangement of interacting parts and employs a minimum number of moving parts. Furthermore, this invention provides vehicle speed announcements through means of a speed announcement storage tape unit that operates continuously, a feature not contemplated in, encompassed by, and not capable of being extended to, and provided in, the above-mentioned announcing systems which produce announcements only when commanded to do so by a pre-recorded program disposed on a second tape containing perforations for energizing and de-energizing the motor of the announcement storage tape unit through electrical contacts. The arrangement of the above-mentioned odometer type announcing system does not encompass, and in its present form, cannot provide a means for recalling or selecting repeatedly a single and specific announcement from a number of serially recorded announcements, a feature which is important, cardinal, and a distinguishing part of this invention.

Yet still another advantage of this invention over other speed announcing devices of like kind of prior art, such as the type disclosed by Miller, Pat. No. 2,362,918, which employs a grooved drum record and stylus and associated intricate drum drive and stylus position mechanisms, is the means provided in our invention for automatically repeating at definite intervals of time the announcement of the speed of a vehicle without the need for manual adjustment or need for closing a special manually actuated electrical switch. In addition, this invention offers a simple arrangement of interacting parts and employs a minimum number of moving parts. In addition, a distinguishing feature of this invention is the provision of means for announcing the speed of a vehicle from a continuously moving magnetic tape storage unit which does not stop to allow a change in the position of a stylus and associated voice reproduction mechanism as required in the above-mentioned device based on a record drum and stylus arrangement. Another distinguishing feature of this invention is the provision of simple means for precisely selecting one from several pre-recorded voice announcements for reproduction in synchronism with a single, corresponding, and related position of a hand on a specially modified disc-drag speedometer movement.

Still another advantage of this invention over visual speed indicators of established art, such as the type disclosed by Pugin, Pat. No. 2,504,582, that gives the speed by position of an indicator hand on a calibrated scale, or as disclosed by Curva, Pat. No. 2,887,679, the type that gives the speed by illumination of a one or two digit number sign on the instrument panel of the vehicle, is the complete elimination of the requirement to visually observe the speed indicator when full attention to road conditions by the vehicle operator is necessary.

In this invention, the step positions of an electromechanical stepper switch or of an electronic shift register are continuously maintained in precise time and space synchronism with corresponding positions of equally spaced speed number announcements disposed on a magnetic recording tape; and through search scanning action in a speed transducer, said scanning action being controlled by and in exact time and space correspondence with the step positions of said stepper relay or shift register, an electronic voice-gate is opened to allow reproduction of a speed number announcement in a loudspeaker whenever the scanner finds the position of a movable element whose position is uniquely related to vehicle speed.

The means by which the objects of this invention are obtained are described more fully with reference to the accompanying drawings, in which.

Figure 1:
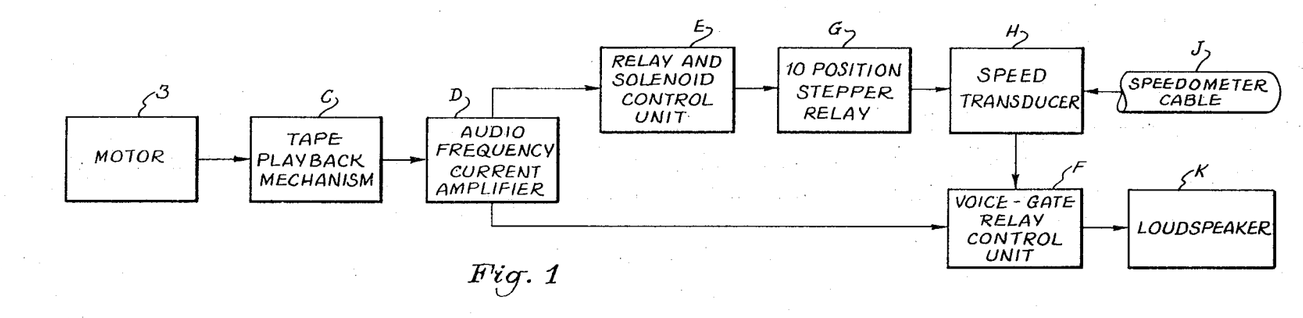
FIG. 1 is a functional block diagram of this invention.

As shown in FIG. 1, there is a motor 3, a magnetic tape playback mechanism C of established art, an audio-frequency current amplifier D of established art, a relay and solenoid current control amplifier unit E, a voice-gate relay control unit F, a ten-position reset-type stepper relay G of established art, a speed transducer H connected to the speedometer cable J of a vehicle, and a loudspeaker K.

Figures 1A, 2:
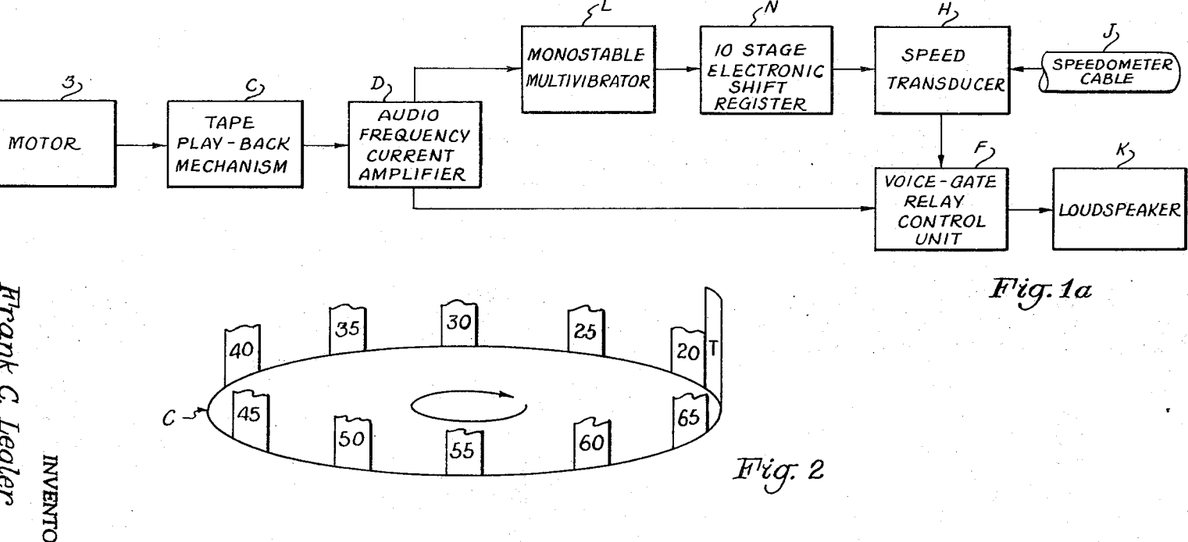
FIG. 1a is a functional block diagram of an alternate arrangement of this invention.
FIG. 2 is a pictorial illustration of the human voice announcements and audio-frequency tone signal train prerecorded on a magnetic tape located in a tape playback unit.

As shown in FIG. 1a, there is a motor 3, a magnetic tape playback mechanism of established art, an audio-frequency current amplifier D of established art, a monostable multivibrator L of established art, a voice-gate relay control unit F, a ten-stage electronic shift register N of established art, a speed transducer H connected to the speedometer cable J of a vehicle, and a loudspeaker K.

The stepper relay G together with the speed transducer H in FIG. 1, and the speed transducer H together with shift register N of FIG. 1a, each, respectively, constitutes a multi-position electrical means. This electrical means is joined to the tape mechanism C.

In the operation of this invention, the stepper relay G, or in the alternate arrangement the shift register N, under the control of a pre-recorded voice and tone signal program stored in tape mechanism C continuously scans the position of a movable member of speed transducer H and opens an electronic gate in voice-gate relay control unit F to permit the corresponding speed number announcement stored in tape playback mechanism C to be reproduced in loudspeaker K whenever the speed announcement corresponds exactly to the correct speed of the vehicle as indicated by the movable member of speed transducer H. In order to utilize the foregoing arrangement to produce a voice announcement of vehicle speed, there may be interconnecting amplifier and signal conditioning circuits of established art employing separately or together different arrangements of electron tubes, semi-conductors, or magnetic core elements to actuate the stepper relay or alternate shift register and to convert the stored voice and tone signals to electrical form and thence to mechanical and audible form in a loudspeaker. A short tone signal is used to reset stepper relay G, or the alternate shift register N, to its starting position after completion of each scanning cycle, thus maintaining precise synchronization between stepper relay or alternate shift register position and a corresponding speed announcement position stored on a magnetic tape in tape mechanism C.

As shown in FIG. 2, there are eleven separate and distinct signal packets impressed on the magnetic recording tape in tape playback mechanism C. Ten of the signal packets

"20"–"25"–"30"–"35"–"40"–"45"–"50"–"55"–"60"–"65"

are words spoken by a human voice and represent the voice announcement signals. The single signal packet "T" represents a short 1000 cycles/second audio-frequency tone signal. The ten voice signal packets have equal amplitudes and the single tone signal packet has an amplitude approximately ten percent higher than the amplitude of the voice signal packets. The direction of rotation of the stored voice and tone signal train is shown by the arrow and for example to be clockwise and in this invention the voice and tone signal train completes one cycle of rotation every 10 seconds. Each voice signal packet is approximately 0.5 second long and the spacing between the end of one voice signal packet and the start of the following voice signal packet is approximately 0.5 second. The length of the tone signal packet is approximately 0.1 second and for reasons that will be described below, there is no spacing between the end of the 1000 cycles/second audio-frequency tone signal packet and the adjacent voice signal packet "20" that immediately follows it. The time duration, spacing, and relative amplitudes of the voice signal packets and tone signal packet, as well as the time required for completion of one cycle of the voice signal packet and tone signal packet train have been chosen for convenience in this embodiment of this invention. In addition, the audio-frequency tone signal can be any convenient audio-frequency that is within the frequency bandpass characteristics of the amplifiers and other signal conditioning circuits used in this invention. As previously indicated, the purpose of the short 1000 cycles/second tone signal is to reset stepper relay G to its starting position, "20," after completion of each scanning cycle.

Figure 3:
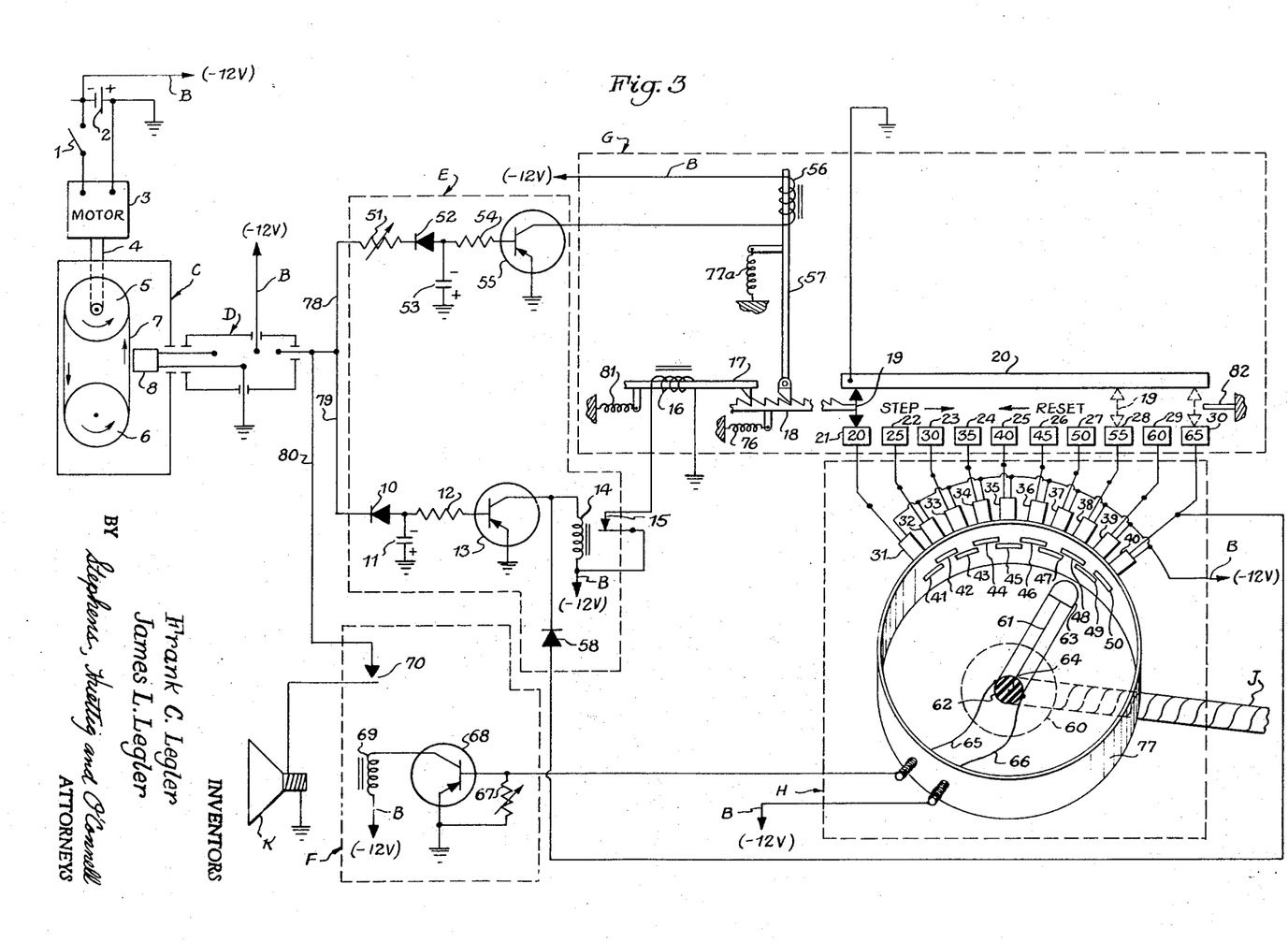
FIG. 3 is a circuit diagram showing the circuit connections used in one embodiment of this invention.

As shown in FIG. 3, a battery 2 supplies electric power through on-off switch 1 to a motor 3 which drives a continuously operating magnetic tape playback mechanism C through drive shaft 4; and through a (12 v.) bus B supplies electric power to an audio-frequency current amplifier D, a relay and solenoid current controller unit E, a stepper relay G, a speed transducer H, and a voice-gate relay control unit F.

Within the tape playback mechanism C, there is located a closed-loop magnetic recording tape 7 passing around two spools 5 and 6, maintaining friction contact with outer edges of the spools and moved at a constant rate of travel past a magnetic pickup head 8 as spools 5 and 6 are rotated by drive shaft 4.

An audio-frequency current amplifier D is connected to the magnetic pickup head 8 and increases the amplitude of the electrical voice and tone signals generated in the pickup head 8 to a higher amplitude level.

Relay and solenoid current controller unit E is composed of two transistorized current amplifiers. A low-sensitivity solenoid-control current amplifier consisting of variable resistor 51, diode rectifier 52, capacitor 53, resistor 54, transistor 55, and electromagnet solenoid 56 responds selectively only to impressed input signal currents having an amplitude equal to or greater than the amplitude of the reset tone signal current and actuates electromagnet solenoid 56 located in stepper relay G, thus effectively discriminating against signal currents of lower amplitude as represented by the voice signal current packets, "20"–"25"–"30"–"35"–"40"–"45"–"50"–"55"–"60"–"65," impressed on the input of the above-described low-sensitivity current control amplifier. A high-sensitivity relay-control current amplifier consisting of diode rectifier 10, capacitor 11, resistor 12, transistor 13, diode rectifier 58, and electromagnetic relay 14 responds to impressed input signal currents having an amplitude equal to or greater than the amplitude of the voice signal current packets, "20" to "65," respectively, and actuates electromagnetic relay 14 to open normally closed relay contact pair 15.

Voice-gate relay control unit F consists of a medium sensitivity relay-control amplifier, consisting of variable resistor 67, transistor 68, and electromagnetic relay 69, and responds to signal currents from a photocell 63 located in speed transducer H and actuates electromagnetic relay 69 to close the normally open relay contact pair 70.

The stepper relay G is composed of ten insulated metallic contact segments 21, 22, 23, 24, 25, 26, 27, 28, 29, 30; a common metallic conductor bus 20; and a metallic wiper arm 19 fixed to a ratchet bar 18 which is actuated in a forward step direction against the opposing force of a tension spring 76 by electromagnet solenoid 16 acting through pawl armature 17 engaging ratchet bar 18. The said wiper arm 19 is released to travel in a reverse reset direction by electromagnet solenoid 56 acting through ratchet-bar latch armature 57 against tension spring 77a to unlatch ratchet bar 18. Attached to pawl armature 17 there is a tension spring 81 to retract pawl armature 17 by one ratchet-bar tooth or indentation whenever electromagnet solenoid 16 is de-energized, that is, whenever current ceases to pass through electromagnet solenoid 16. A stationary mechanical stop 82 is provided to limit the full travel of wiper arm 19.

Speed transducer H is composed of a speedometer cable and housing J appropriately connected at one end to the speedometer gear of an automobile or other vehicle and connected at the transducer end to a conventional disc-drag speedometer movement 60 which converts rotary motion of speedometer cable J to an angular displacement of speedometer movement shaft 64. A switching element composed of a small light-sensitive photocell 63 is rigidly affixed to and supported by a rigid beam 61 which is connected solidly and rigidly to the shaft 64. Electrical connection to the photocell 63 is made by conductors 65 and 66, both composed of very small, fine, highly flexible wire insulated from metallic shaft 64 by insulator 62. Encircling the axis of the shaft 64 there is disposed a circular ring member 77 of metal or opaque plastic material containing ten open overlapping light slits 41, 42, 43, 44, 45, 46, 47, 48, 49, 50, adjacent to ten lamp and associated lamp housings 31, 32, 33, 34, 35, 36, 37, 38, 39, 40 which are mounted on the said ring member 77.

Finally, an electromagnetic loudspeaker K is provided to convert electrical voice signal currents from amplifier D into audible form whenever electromagnetic relay 69 is energized to close relay contact pair 70.

The operation and interaction of the various parts of this invention is as follows. Referring to FIG. 3, when on-off switch 1 is closed, battery 2 supplies electric power simultaneously through bus B to tape mechanism drive motor 3, to audio-frequency current amplifier D, to relay and solenoid control current amplifier unit E, to voice-gate relay control unit F, to stepper relay G, and to speed transducer H. Upon closure of switch 1, motor 3 is energized and rotates drive shaft 4 through appropriate reduction gears, not shown, to rotate spools 5 and 6 in the directions shown by the arrows. A closed-loop magnetic recording tape 7 passes around spools 5 and 6 and maintains friction contact with outer edges of the spools. Rotation of spools 5 and 6 continuously circulates the closed-loop magnetic tape 7 containing ten pre-recorded voice announcements "20" to "65," respectively, spoken by a human voice, and one short audiofrequency tone pulse of approximately 1000 cycles/second in the time and space sequence and at relative amplitudes as shown in FIG. 2. Magnetic tape 7 continuously passes adjacent to magnetic pickup head 8 which converts the pre-recorded and stored voice and tone signals on the tape into electric signal currents suitable, after amplification by audio-frequency current amplifier D, for actuating electromagnetic relay 14 and electromagnet solenoids 16 and 56 at the proper times to be described hereafter and also for driving magnetic loudspeaker K to reproduce in audible form the pre-recorded numbers spoken by a human voice.

The pre-recorded voice and tone signal train in the form of alternating electric currents generated by magnetic pickup head 8 pass through connecting conductors into audio-frequency current amplifier D where the electric currents are amplified to suitable amplitude levels. From the output of amplifier D, the pre-recorded voice and tone signal train in the form of alternating electric currents passes by way of conductor 78 into a low-sensitivity control current amplifier composed of variable resistor 51, diode rectifier 52, capacitor 53, resistor 54, transistor 55, and electromagnet solenoid 56; and passes by way of conductor 79 to a high-sensivity control current amplifier composed of diode rectifier 10, capacitor 11, resistor 12, transistor 13, electromagnetic relay 14, and diode rectifier 58; and passes by way of conductor 80 to a branch circuit composed of normally open relay contact pair 70 and loudspeaker K.

When each one of the ten pre-recorded voice signal currents and the tone signal current separately flow in the first-mentioned low-sensitivity amplifier branch circuit by way of conductor 78, the alternating current, as determined in value by the setting of variable resistor 51, is rectified to direct current by diode rectifier 52 and the resulting electric charges corresponding to discrete parts of the voice signal and tone signal are integrated and momentarily stored in capacitor 53, after which the charge leaks off at a slow rate, determined principally by the time constant of the combination of capacitor 53, resistor 54, and base-emitter resistance of transistor 55, to produce a direct current in resistor 54 and base-emitter control junction of transistor 55 in series, to ground. During flow of the current through the base-emitter control junction of transistor 55, an electric current of amplitude higher than the weak direct current flowing into the base electrode of transistor 55 flows from battery 2 by way of power supply bus B ($-12$ v.) through electromagnet solenoid 56 and the collector-emitter junction of transistor 55 in series, to ground. By proper adjustment of the relative amplitudes of the levels of the voice and tone signals impressed on and stored on magnetic tape 7 during the recording process, and by proper adjustment of the signal level gain of audio-frequency amplifier D, and by the proper setting of solenoid 56 actuation threshold current level by means of variable resistor 51, the lower amplitude electric current flowing through electromagnet solenoid 56 as a result of the lower amplitude level voice signal current is insufficient to overcome the opposing force of spring 77a. Consequently ratchet-bar latch armature 57 does not move to disengage and unlatch ratchet bar 18; consequently ratchet bar 18 and attached wiper arm 19 remain stationary. On the other hand, the reset tone signal current, having a higher amplitude level than the voice signal currents impressed on the low-sensitivity amplifier exceeds the solenoid 56 actuation threshold current determined by the setting of variable resistor 51 and causes sufficient current to flow in electromagnet solenoid 56 to overcome the opposing force of tension spring 77a, thus causing ratchet bar 18 and attached wiper arm 19 through means of tension spring 76 to return quickly to home position, that is at station "20" on contact segment 21, and away from any of the nine insulated metallic contact segments 22 to 30 on which the wiper arm 19 may have been stationed when reset tone signal impressed on magnetic recording tape 7 arrives at magnetic pickup head 8.

As each one of the ten pre-recorded voice signal currents and the reset tone signal current separately flow in the high-sensitivity amplifier branch circuit by way of conductor 79, the alternating current is rectified to direct current by diode rectifier 10 and the resulting electric charges corresponding to discrete parts of the voice signal and tone signal are integrated and momentarily stored in capacitor 11, after which the charge leaks off at a slow rate, determined principally by the time constant of the combination of capacitor 11, resistor 12, and base-emitter resistance of transistor 13, to produce a direct current in resistor 12 and base-emitter control junction of transistor 13 in series, to ground. During flow of the current through the base-emitter control junction of transistor 13, an electric current of amplitude higher than the direct current flowing into the base electrode of transistor 13 flows from battery 2 by way of power supply bus B ($-12$ v.) through electromagnetic relay 14 and the collector-emitter junction of transistor 13 in series, to ground. By proper adjustment of the amplitude levels and time duration of the voice and tone signals impressed on and stored on magnetic tape 7; and by proper adjustment of the signal level gain of audio-frequency amplifier D; and by the proper selection of the values of capacitor 11, resistor 12, and base-emitter control junction resistance of transistor 13; and by proper adjustment of the pull-in and drop-out threshold current settings on electromagnetic relay 14 to cause normally closed relay contact pair 15 to open and close, respectively; then each one of the ten pre-recorded voice signal current packets and the reset tone signal current packet will cause electromagnetic relay 14 to pull in during the initial part of the signal current packet occurrence, causing normally closed relay contact pair 15 to open, and remain in a pull-in position to keep open the normally closed relay contact pair 15 for a definite period of time following the arrival of the leading edge of the signal current packet. Approximately 0.2 second after the completion of the signal current packet occurrence, the base-emitter control current in transistor 13 decreases to a value to cause the collector-emitter current through electromagnetic relay 14 to fall to the drop-out threshold current value, thereby returning relay contact pair 15 to a normally closed position. In this mode of operation, a series of equally spaced signal current packets will cause relay contact pair 15 to cycle open and close in a repetitive manner. In this invention, each one of the ten pre-recorded voice signal packets and the reset tone packet is integrated by action of diode rectifier 10, capacitor 11, resistor 12, and base-emitter resistance of transistor 13 into a single direct current impulse that opens and closes relay contact pair 15 at a discrete rate of occurrence. The opening and closing of relay contact pair 15 causes current impulses to flow from battery 2 by way of power supply bus B (−12 v.) through electromagnet solenoid 16 of stepper relay G, to ground. Each time relay contact pair 15 closes, a current impulse through electromagnet solenoid 16 of stepper relay G causes pawl armature 17 to advance ratchet bar 18 one tooth or indentation against the opposing force of tension spring 76. Movement of ratchet bar 18 by one tooth or indentation steps the attached wiper arm 19 one full step along a half ladder arrangement consisting of common metallic bus 20 and ten insulated metallic contact segments 21 to 30. Wiper arm 19 provides an electrical current path between common metallic bus 20 and each of the ten insulated metallic contact segments 21 to 30, separately, depending upon the particular station where wiper arm 19 is standing. This lights one of the lamps 31 to 40, inclusive.

Photocell 63, located in speed transducer H, responds to light from any one energized lamp of the ten lamps 31 to 40, and thereby increases the electrical current flowing from battery 2, by way of power supply bus B (−12 v.), through the photocell 63 and conductors 65 and 66 and jointly through variable resistor 67 and base-emitter junction of transistor 68, to ground. During passage of the current through the base-emitter control junction of transistor 68 an electric current of amplitude higher than the current through photocell 63 flows from battery 2, by way of power supply bus B (−12 v.), through electromagnetic relay 69 and the collector-emitter junction of transistor 68 in series, to ground. By proper adjustment of variable resistance 67 and adjustment of pull-in and drop-out threshold current values of electromagnetic relay 69, the current from photocell 63 will cause the current in electromagnetic relay 69 to exceed the pull-in threshold current value, thereby causing relay contact pair 70 to close. Variable resistance 67 adjusts the current gain of transistor 68 amplifier stage so that the dark current in photocell 63 will not cause the current in electromagnetic relay 69 to exceed the pull-in threshold current value of the relay. In this mode of operation, photocell 63 causes relay contact pair 70 to close whenever the photocell is adjacent to any energized lamp of the lamp array 31 to 40. Closing of relay contact pair 70 completes an electrical circuit from the output of audio-frequency current amplifier D through line 80, relay contact pair 70, and voice coil of loudspeaker K to ground, to reproduce in audible form whatever electrical signal current is being produced in the output of audio-frequency amplifier D at the time that relay contact pair 70 is closed. Each of the lamps 31 to 40, located in speed transducer H is energized individually and separately from battery 2 by way of power supply bus B (−12 v.), through each lamp filament, through its respective connecting conductor to its respective insulated metallic contact segment in stepper relay G, through wiper arm 19, and through common metallic conductor bus 20, to ground.

Having described in depth the specific operating characteristics and operating modes of each of the various functional parts of this invention, a description follows of the sequence of operations of each part and interactions among the interconnecting parts during one complete cycle of the pre-recorded voice and tone signal train shown in FIG. 2 as the magnetic recording tape 7 continuously moves at a constant rate of travel past magnetic pickup head 8. When motor 3 is energized by battery 2 through closing of on-off switch 1, spools 5 and 6 in the circulating tape mechanism C rotate in a counterclockwise direction and transport magnetic tape 7 at a constant rate of travel past the magnetic pickup head 8 to deliver alternating electric signal currents to audio-frequency current amplifier D which produces in conductors 78, 79, and 80 an amplified reproduction of electric signal currents entering the amplifier D. Assuming the following initial conditions to exist, for the sake of explanation, as the cycle of operation is entered, the sequence of operation of the various parts of the invention in response to the effects of the signal currents from audio-frequency current amplifier D follows.

(A) Vehicle speed is assumed to be fifty-five miles per hour throughout the sequence of operations to be described and photocell 63 in speed transducer H is positioned adjacent to light slit 48 in direct line with lamp 38.

(B) Wiper arm 19 in stepper relay G is standing on station "55," metallic contact segment 28.

(C) Lamp 38 is energized from bus B (−12 v.) through lamp filament, wiper arm 19, common metallic conductor bus 20, to ground.

(D) Normally open relay contact pair 70 is closed through action of light from lamp 38 falling on photocell 63 through light slit 48 to cause actuation of electromagnetic relay 69.

(E) Speed announcement word "fifty-five" in the form of an alternating current starts to flow from the output of audio-frequency amplifier D through conductors 78, 79, 80, simultaneously.

Under the above initial conditions, the following actions occur during a time interval of approximately 10 seconds after the word "fifty-five" voice signal current starts to flow from the output of amplifier D.

(a) The voice signal current packet "fifty-five" from the output of audio-frequency amplifier D flows through conductor 80, through closed relay contact pair 70, and through voice coil of loudspeaker K to ground, to produce an audible reproduction of the word "fifty-five" originally pre-recorded by a human voice on the magnetic recording tape 7, thus giving a single announcement of the correct speed of the vehicle.

(b) Simultaneously, the voice signal current packet "fifty-five" also passes along conductor 78, but does not have a sufficient amplitude level to actuate electromagnet solenoid 56 in stepper relay G, thus ratchet-bar latch armature 57 does not unlatch ratchet bar 18.

(c) The voice signal current packet "fifty-five" also passes along conductor 79 and after rectification to direct current by diode rectifier 10 and integration by capacitor 11 it produces in the base-emitter junction of transistor 13 a discharge current which has an amplitude level sufficient to actuate electromagnetic relay 14 in the collector-emitter circuit of transistor 13 and to cause the relay current to be maintained above its pull-in threshold current value for a period of approximately 0.7 second after the voice signal current packet starts.

(d) During the 0.7 second interval of time that the current through electromagnetic relay 14 is above its pull-in threshold current value, the normally closed relay contact pair 15 is open and thus interrupts the current through electromagnet solenoid 16.

(e) Interruption of current through electromagnet solenoid 16 causes pawl armature 17 to be retracted by one tooth or indentation on ratchet bar 18 by action of pawl armature return tension spring 81.

(f) After 0.7 second following the start of the voice signal packet "fifty-five," the current in electromagnetic relay 14 falls below its drop-out threshold current value causing relay contact pair 15 to move to a normally closed position.

(g) Closing of relay contact pair 15 to a normally closed position causes an impulse of current to flow through electromagnet solenoid 16 in stepper relay G for approximately 0.1 second, thereby causing pawl armature 17 to advance wiper arm 19 one step to station "60," metallic contact segment 29, through motion of ratchet bar 18.

(h) As soon as wiper arm 19 leaves station "55" metallic contact segment 28, the electric current path through lamp 38 is opened, causing lamp 38 to be extinguished.

(i) As soon as lamp 38 is extinguished, photocell 63 receives no light and thus causes the current in electromagnetic relay 69 to fall below its drop-out threshold current value, to open relay contact pair 70.

(j) As soon as wiper arm 19 reaches station "60," metallic contact segment 29, lamp 39 is energized from the bus B (−12 v.) through lamp filament, wiper arm 19, common metallic conductor bus 20, to ground. Photocell 63 receives no light from lamp 39 since the photocell remains adjacent to light slit 48 and lamp 38, thus relay contact pair 70 on electromagnetic relay 69 remains open from action described in paragraph (i) and no audible reproduction of the voice announcement "sixty" is heard from loudspeaker K.

(k) By the time wiper arm 19 reaches station "60," metallic contact segment 29, the magnetic recording tape 7 has advanced to the beginning of the next pre-recorded speed announcement, "sixty," and the voice signal current packet "sixty" starts to flow from the output of audio-frequency amplifier D through conductors 78, 79, and 80, simultaneously.

(l) The voice signal current packet "sixty" produces the same sequential action in electromagnet solenoid 56, electromagnetic relay 14, electromagnet solenoid 16, and relay contact pair 15 as produced by voice signal current packet "fifty-five" as described in paragraphs (b), (c), (d), (e), (f), (g), except that wiper arm 19 in stepper relay G advances to station "65," metallic contact segment 30 after conclusion of voice signal current packet "sixty."

(m) As soon as wiper arm 19 leaves station "60," metallic contact segment 29, the electric current path through lamp 39 is opened causing lamp 39 to be extinguished.

(n) As soon as wiper arm 19 reaches station "65," metallic contact segment 30, lamp 40 is energized from the bus B (−12 v.) through lamp filament, wiper arm 19, bus 20, to ground. Photocell 63 receives no light from lamp 40 since photocell 63 remains adjacent to light slit 48 and lamp 38, thus relay contact pair 70 on electromagnetic relay 69 remains open from action described in paragraph (i) and no audible reproduction of the "sixty-five" voice signal current is heard from loudspeaker K.

(o) By the time wiper arm 19 reaches station "65," metallic contact segment 30, the magnetic recording tape 7 has advanced to the beginning of the next pre-recorded voice announcement "sixty-five" and the voice signal current packet starts to flow from the output of audio-frequency amplifier D through conductors 78, 79, and 80, simultaneously.

(p) The voice signal current packet "sixty-five" produces the same sequential action in electromagnet solenoid 56, electromagnetic relay 14, electromagnet solenoid 16, and relay contact pair 15, as produced by voice signal current packet "fifty-five" described in paragraphs (b), (c), (d), (e), (f), (g), except that wiper arm 19 in stepper relay G does not move off of station "65," metallic contact segment 30, after completion of voice signal current packet "sixty-five" on account of action of stationary mechanical stop 82 against wiper arm 19, and on account of the current holding action in electromagnetic relay 14 produced by diode rectifier 58. Diode rectifier 58 provides a current path from the bus B (−12 v.) through electromagnetic relay 14, through metallic contact segment 30 and wiper arm 19, and through common metallic collector bus 20, to ground, thus keeping electromagnetic relay 14 energized and normally closed relay contact pair 15 in the open position to prevent electromagnet solenoid 16 from being actuated until after wiper arm 19 has been reset to station "20" and the voice announcement packet "twenty" has been completed.

(q) Approximately 0.4 second after completion of voice signal current packet "sixty-five" the magnetic recording tape 7 has advanced to the beginning of the next pre-recorded signal position, the 1000 cycles/second reset tone signal pulse, and the reset tone signal current starts to flow from the output of audio-frequency amplifier D through conductors 78, 79, and 80, simultaneously.

(r) The reset tone signal current pulse passes through conductor 78 and after rectification to direct current by diode rectifier 52 and integration by capacitor 53 it produces in the base-emitter junction of transistor 55 a discharge current which has sufficient amplitude level to actuate electromagnet solenoid 56 in the collector-emitter circuit of transistor 55, thus momentarily disengaging ratchet-bar latch armature 57 from ratchet bar 18 to permit wiper arm 19 attached to ratchet bar 18 to quickly reset, through aid of ratchet-bar return spring 76, to station "20," metallic contact segment 21. No sound is reproduced in loudspeaker K during reset of wiper arm 19 since the filament of lamp 38 does not have sufficient time to become appreciably energized and activate photocell 63 during the very short time that wiper arm 19 is passing over metallic contact segment 28 during the rapid return of the wiper arm 19 to station "20."

(s) The reset tone signal current pulse packet also passes through conductor 79 and after rectification to direct current by diode rectifier 10 and integration by capacitor 11 it produces in the base-emitter junction of transistor 13 a discharge current which has a sufficient amplitude level to actuate electromagnetic relay 14 in the collector-emitter circuit of transistor 13 and to maintain the current in relay 14 above its pull-in threshold current value for a period of approximately 0.1 second. During the 0.1 second interval of time that the current through electromagnetic relay 14 is above its pull-in current value, the normally closed relay contact pair 15 is open. It is instructive for a complete understanding of this invention to point out that relay contact pair 15 is opened during the occurrence of the last pre-recorded voice announcement "sixty-five" and remains open between the end of the "sixty-five" signal packet and beginning of the reset tone signal through action of diode rectifier 58; and that relay contact pair 15 continues to be maintained in an open position by action of the reset tone signal current which keeps the current through electromagnetic relay 14 above its hold-in threshold current value during the occurrence of the reset tone pulse packet.

(t) By the time the reset tone pulse occurrence is completed and the end of the pre-recorded tone signal impressed on magnetic tape 7 passes under the magnetic pickup head 8, the magnetic recording tape 7 has advanced the voice and tone signal train impressed on the tape to the beginning of the next pre-recorded voice announcement "twenty" and the voice signal current packet "twenty" starts to flow from the output of audio-frequency amplifier D through conductors 78 and 79 simultaneously. The voice announcement "twenty" is impressed on the magnetic recording tape 7 immediately after the trailing edge of the reset tone signal, without any space between the two recorded signals. It is again instructive to point out that the reason for the voice announcement "twenty" being impressed immediately following, and without time separation from, the reset tone signal is to maintain the current in electromagnetic relay 14 above the relay hold-in threshold current value, thus keeping relay contact pair 15 in an open position until the voice announcement packet "twenty" is completed. Otherwise, electromagnet solenoid 16 would be actuated and cause wiper arm 19 to step off of station "20," metallic contact segment 21, before arrival of voice signal current "twenty" and thus upset the synchronization of the position of wiper arm 19 with the corresponding position of the voice signal "twenty" on magnetic recording tape 7.

(u) The voice signal current packet "twenty" produces the same sequential action in electromagnet solenoid 56, electromagnetic relay 14, electromagnet solenoid 16, and relay contact pair 15, as produced by voice signal current packet "fifty-five" described in paragraphs b to g, except that wiper arm 19 in stepper relay G steps to station "25," metallic contact segment 22, at the conclusion of voice current packet "twenty."

(v) The same sequence of events occur for each of the remaining pre-recorded voice signal current packets "twenty-five," "thirty," "thirty-five," "forty," "forty-five" and "fifty," when the magnetic recording tape 7 positions each one separately at the magnetic pickup head 8.

(w) After completion of voice signal packet "fifty" and as soon as wiper arm 19 in stepper relay G leaves station "50," metallic contact segment 27, the electric current path through lamp 37 is opened, causing lamp 37 to be extinguished.

(x) As soon as wiper arm 19 in stepper relay G reaches station "55," metallic contact segment 28, caused by actuation of solenoid 16; lamp 38 is energized from bus B (−12 v.) through the lamp filament, wiper arm 19, common metallic conductor bus 20, to ground. Photocell 63 receives light from energized lamp 38 through light slit 48 and causes the current in electromagnetic relay 69 to increase to a value above the relay pull-in threshold current value, thus closing relay contact pair 70 to provide a complete electrical current path from the output of audio-frequency amplifier D, through conductor 80, through the voice coil of loudspeaker K to ground, to produce an audible reproduction of the word "fifty-five" originally pre-recorded by a human voice on the magnetic recording tape 7, thus announcing the correct speed of the vehicle.

(y) Thus the cycle of operation of this invention is re-entered at the assumed initial conditions and one complete cycle of mechanical and electrical events has been traced as the magnetic recording tape 7 continuously moves past magnetic pickup head 8, delivering pre-recorded voice and tone signals to the head and following circuitry connected thereto.

Figure 4:
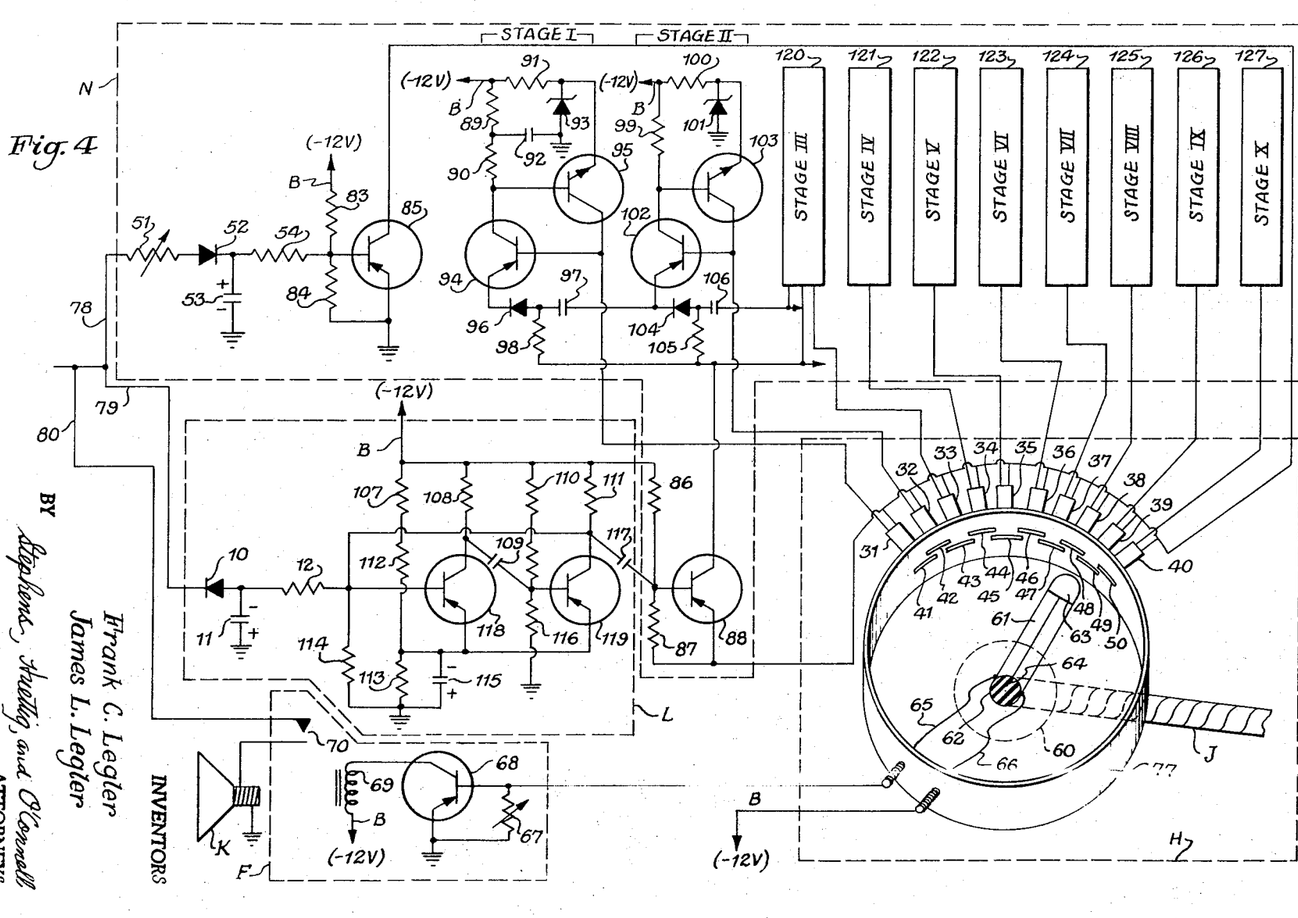
FIG. 4 is a circuit diagram showing the circuit connections used in an alternate arrangement of this invention.

FIG. 4 discloses an alternate arrangement of this invention in which an electronic shift register of established art replaces the stepper relay.

In FIG. 4, the switch 1, motor 3, shaft 4, and tape playback mechanism C consisting of spools 5 and 6 transporting magnetic tape 7 containing ten pre-recorded voice announcements and a reset tone, magnetic pickup head 8, and audio-frequency current amplifier D perform the same circuit functions in exactly the same manner as performed by these parts in the arrangement of the invention shown in FIG. 3. In addition, the conductor 80; relay contact pair 70; loudspeaker K; electromagnetic relay 69; transistor 68; variable resistor 67; and the speed transducer H, composed of a speedometer cable and housing J, a disc-drag speedometer movement 60, speedometer movement shaft 64, photocell 63 and supporting beam 61, electrical connections 65 and 66, insulator 62, ring member 77, light slits 41 to 50, and associated lamp housings 31 to 40; all perform the same function in the arrangement of the invention shown in FIG. 4 as performed by these parts in the arrangement of the invention shown in FIG. 3 and described above.

In FIG. 4, the lamps 31 to 40, in speed transducer H are energized separately and in proper sequence by ten shift register stages of established art. Stage I, composed of transistors 94 and 95, rectifier diode 96, Zener regulator diode 93, resistors 89, 90, 91, 98, capacitors 92 and 97; causes lamp 31 in speed transducer H to be energized only when transistor 95 is conducting; namely when the transistor is "turned-on" after shift register reset action to be described. Stage II, composed of transistors 102 and 103, rectifier diode 104, Zener regulator diode 101, resistors 99, 100, 105, capacitor 106; causes lamp 32 in speed transducer H to be energized only when transistor 103 is conducting; namely, when the transistor is "turned-on" at the end of voice announcement "twenty." Shift register stages 120, 121, 122, 123, 124, 125, 126, 127 are identical to shift register Stage II and cause lamps 33 to 40 in speed transducer H to be energized, respectively, in the same manner that lamp 32 is energized by shift register Stage II. The function of Zener regulator diodes 93 and 101 is to keep the emitter electrodes of transistors 95 and 103, respectively, at a potential of (−9 volts). In operation, the shift registers are "turned-on" and "turned-off" sequentially and only one stage at a time by trigger pulses derived from the voice announcement signals produced at the output of audio-frequency current amplifier D. Interposed between amplifier D and the shift register string there is located a high-sensitivity monostable multivibrator composed of transistors 118 and 119, resistors 107, 108, 110, 111, 112, 113, 114, 116 and capacitors 115, 109, 117; and a trigger amplifier composed of transistor 88, and resistors 86 and 87. The multivibrator and this triggering amplifier are used to step the shift register string from one stage to the following stage. Also interposed between audio-frequency current amplifier D and the shift register string there is located a second triggering amplifier composed of transistor 85, and resistors 83 and 84. The last mentioned triggering amplifier is used to reset the shift register string to starting position, position "20," Stage I.

It is further instructive to describe the operation of the shift register string in energizing and de-energizing lamps in speed transducer H. For sake of explanation, assume that transistors 85 and 88 are conducting, shift register Stage I is turned on and lamp 31 is energized, and that speed announcement "20" signal current in conductor 79 has just triggered into operation the multivibrator composed of transistors 118 and 119 and associated resistors and capacitors. Under these initial conditions the multivibrator will go through one complete cycle and 0.7 second after being triggered will produce a short current pulse flowing out of the base-emitter junction of transistor 88. During the 0.7 second interval the speed announcement signal current has occurred and has terminated. The current flow out of the base of transistor 88 turns off the transistor collector-emitter current momentarily and isolates transistor 94 in shift register Stage I from ground. Transistor 94 which has been conducting to this point is quickly turned off, since it has no collector-emitter current, thus turning off transistor 95 through placing the base electrode of transistor 95 to a higher negative potential than the emitter electrode. Following these events, lamp 31 is de-energized, capacitor 97 starts to discharge through base-emitter junction of transistor 102 in shift register Stage II to turn on transistor 102 as soon as the triggering current pulse out of transistor 88 is completed and a circuit from ground through transistor 88 becomes available to transistor 102 to cause its collector electrode potential to be placed near ground potential. At the same time the base electrode of transistor 103 which is connected to the collector electrode of transistor 102 is also pulled close to ground potential and consequently causes current to flow from the base of transistor 103 to turn on the transistor to complete a current path through its collector-emitter circuit and energize lamp 32. Thus the actions to de-energize lamp 31 and to energize lamp 32 have been completed. In like manner, each of the other lamps in speed transducer H are de-energized and energized in the exact same manner, except for lamp 31 which is energized when shift register Stage I is automatically turned on following reset action through opening of the collector-emitter circuit in transistor 85 to reset the shift register string. In this case, shift register Stage I is turned on and locked on when transistor 85 is turned back on following a reset pulse and capacitor 92 momentarily places the base electrode of transistor 95 near ground to turn on transistor 95 and at the same time turn on transistor 94. When transistor 95 is turned on current flows through its collector-emitter circuit and energizes lamp 31.

In FIG. 4, the electric signal currents corresponding to the ten voice announcements "20" to "65," and a single 1000 cycles/second reset tone flow from the output of amplifier D through conductors 78, 79, and 80 in the same sequence as described in the arrangement of the invention shown in FIG. 3 and described above. As the voice signal and reset tone signal current packet train passes by way of conductor 78 to the low-sensitivity triggering amplifier consisting of variable resistor 51, rectifier diode 52, capacitor 54, resistors 54, 83, 84, and transistor 85, the alternating current as determined in value by the setting of variable resistor 51, is rectified to direct current by diode rectifier 52 and the resulting electric charges corresponding to discrete parts of the voice signal and tone signal are integrated and momentarily stored in capacitor 53, after which the charge leaks off to produce a pulse of current that opposes the current normally flowing in the base-emitter junction of transistor 85, thus tending to reduce the high current normally flowing in the collector-emitter circuit of transistor 85. By proper adjustment of the relative amplitudes of the levels of the voice and tone signals impressed on and stored on magnetic tape 7 during the pre-recording process, and by proper adjustment of the signal level gain of audio-frequency current amplifier D, and by the proper setting of resistor 51, the reset tone signal current flowing out of the base electrode of transistor 85 will cause the normally flowing current in the collector-emitter circuit of transistor 85 to be decreased to a low value or "turned-off." Turning off the collector-emitter current of transistor 85 causes the ground seeking bus of the filament terminals on lamps 31 to 40, and the ground side of triggering transistor 88 to be isolated from ground at the emitter of transistor 85. This action de-energizes the entire shift register string and de-energizes lamp 40. As soon as the current pulse flowing out of the base electrode of transistor 85, which results from the reset tone, decreases to a low value as the charge on capacitor 53 discharges, the normal current flowing into the base electrode of transistor 85 is restored to its former high value as determined by resistors 83 and 84. This action causes the normally-on current in the collector-emitter circuit of transistor 85 to return to normal value, thus "turning-on" the transistor 85 and re-energizing the shift register string. The string is re-energized approximately 0.1 second after the start of the 1000 cycles/second reset tone signal occurrence. As soon as the shift register string is re-energized, Stage I transistors 94 and 95 are turned on automatically through action of capacitor 92, thus energizing lamp 31 in speed transducer H. The amplitude level of the voice signal currents are insufficient to turn-off transistor 85 and consequently do not cause the shift register string to reset.

As each one of the ten pre-recorded voice signal currents and the reset tone signal current separately flow by way of conductor 79 to the high-sensitivity monostable multivibrator composed of transistors 118, 119 and associated resistors and capacitors, the alternating current is rectified to direct current by diode rectifier 10 and the resulting electric charges corresponding to discrete parts of the voice signal and tone signal are integrated and momentarily stored in capacitor 11, after which the charge leaks off to produce a pulse of current into the base electrode of transistor 118 sufficient to trigger the multivibrator into one complete cycle of operation for an interval of time determined by the current switching properties of transistors 118 and 119 and associated resistors and capacitors. The output signal from the multivibrator at the collector electrode of transistor 119 is a negative-going voltage pulse that is a square wave of approximately 0.7 second duration. This negative-going voltage pulse is applied to the base electrode of triggering transistor 88 through capacitor 117 and by means of differentiating action produced by capacitor 117 and resistor 87, the trailing edge of the negative-going voltage pulse from the multivibrator produces a short input current pulse into the triggering transistor 88 that opposes the current normally flowing in the base-emitter junction of transistor 88. The action of the short positive-going current pulse is to turn off the current flowing in the collector-emitter circuit of transistor 88, thus causing the shift register to switch off the current in whichever one of the lamps 31 to 40 in speed transducer H is energized and at the same time to energize the adjacent lamp; for example, if lamp 32 is held energized during the turned on state of shift register Stage II, then lamp 32 is extinguished and lamp 33 is energized through shift register Stage III when Stage II receives a shift pulse. Through these circuit actions and at approximately 0.7 second after arrival of the voice signal at the multivibrator input, the front edge of the voice signal current packet "twenty" at the input of the monostable multivibrator causes shift register Stage I to extinguish lamp 31 and to energize lamp 32 in speed transducer H. In the same manner each of the voice signal packets causes one lamp to be extinguished and the adjacent lamp to be energized except at the end of the voice signal train when lamp 40 is energized. In this case, voice signal current packet "sixty-five" switches off lamp 40 through shift register Stage X at approximately 0.7 second after start of the packet and produces no further action in the shift registering string.

The arrival of the front edge of the 1000 cycles/second reset tone signal packet at the monostable multivibrator input initiates the action in the multivibrator, in the triggering transistor 88, and in shift register Stage I to turn off lamp 31 and energize lamp 32 in speed transducer H. In all operations of the shift register string, each stage is shifted to the following stage only after a voice announcement is completed; consequently each lamp in speed transducer H is extinguished and the adjacent lamp energized only after a voice announcement is completed.

Other modifications of this invention that could be made without departing from the spirit and purpose of the invention would be the use of magnetic recording wire, or the use of ten fixed metallic contact segments together with a movable metallic contact wiper to replace the ten lamps and photocell in speed transducer H, or the use of discrete pre-recorded tone signals together with appropriate tone filters to step and reset stepper relay G instead of using the voice packets to step the relay, or the use of a speed transducer having an output voltage proportional to the speed of the vehicle together with appropriate voltage level comparator circuits to synchronize a voice announcement with a corresponding voltage output from the speed transducer. In addition, speed numbers and announcement intervals other than the ones used in this disclosure can be used without departing from the spirit of this invention.

Furthermore, this invention can be used to announce the engine speed or power transmission speed of an automobile or other vehicle and thus be designated as a talking tachometer.

While a specific embodiment of an automatic speed announcing device has been disclosed in the foregoing description, it will be understood that various modifications within the spirit of the invention may occur to those skilled in the art. Therefore it is intended that no limitations be placed on the invention except as defined by the scope of the appended claims.

Having now described the means by which the objects of this invention are obtained,

We claim:

1. An audible speed announcer comprising continuously cycled serially voice recorded tape means for producing sequentially different voice announced speeds, multi-position electrical means joined to said tape means with each electrical position corresponding to a voice announced speed, electrical switch element means responsive to changes in speed for selectively sensing each of said electrical positions and for producing an output signal when the speed position of said switch element means coincides with the same speed for a particular electrical position, and loudspeaker means joined between said tape means and said switch element means for being energized by said signal and announcing the speed at the coincidence of an electrical position and a speed position of said switch element means.

2. An announcer as in claim 1, said tape means including one reset tone means for resetting said multi-position electrical means.

3. An announcer as in claim 2, said switch element means comprising a movable photocell in a light beam commutator circuit.

4. An announcer as in claim 3, said multi-position electrical means including a multi-position stepper relay with a reset position.

5. An announcer as in claim 3, said multi-position electrical means including a shift register string with a reset position.

6. An announcer as in claim 3, said switch element means further including disc-drag speedometer mechanism means for moving said photocell.

References Cited

UNITED STATES PATENTS

| 2,435,066 | 1/1948 | Barsh | 340—221 |
| 2,831,546 | 4/1958 | Henderson | 340—53 |
| 3,081,431 | 3/1963 | Werner et al. | 179—100.2X |
| 3,298,010 | 1/1967 | Dubosq et al. | 340—221 |
| 3,311,882 | 3/1967 | Reijns et al. | 340—268X |
| 3,372,240 | 3/1968 | Boyers et al. | 179—6.1UX |
| 3,412,215 | 11/1968 | Rawley | 179—100.2 |

THOMAS B. HABECKER, Primary Examiner

H. S. COHEN, Assistant Examiner

U.S. Cl. X.R.

179—100.1, 100.2